(No Model.) 2 Sheets—Sheet 1.

H. S. LLOYD.
STORAGE BATTERY.

No. 604,588. Patented May 24, 1898.

Witnesses:
Jno. G. Parker
J. Henderson

Inventor.
H. S. Lloyd,
by his Attorney,
James Petit

THE NORRIS PETERS CO., PHOTO-LITHO., WASHINGTON, D. C.

(No Model.)  2 Sheets—Sheet 2.
H. S. LLOYD.
STORAGE BATTERY.
No. 604,588. Patented May 24, 1898.
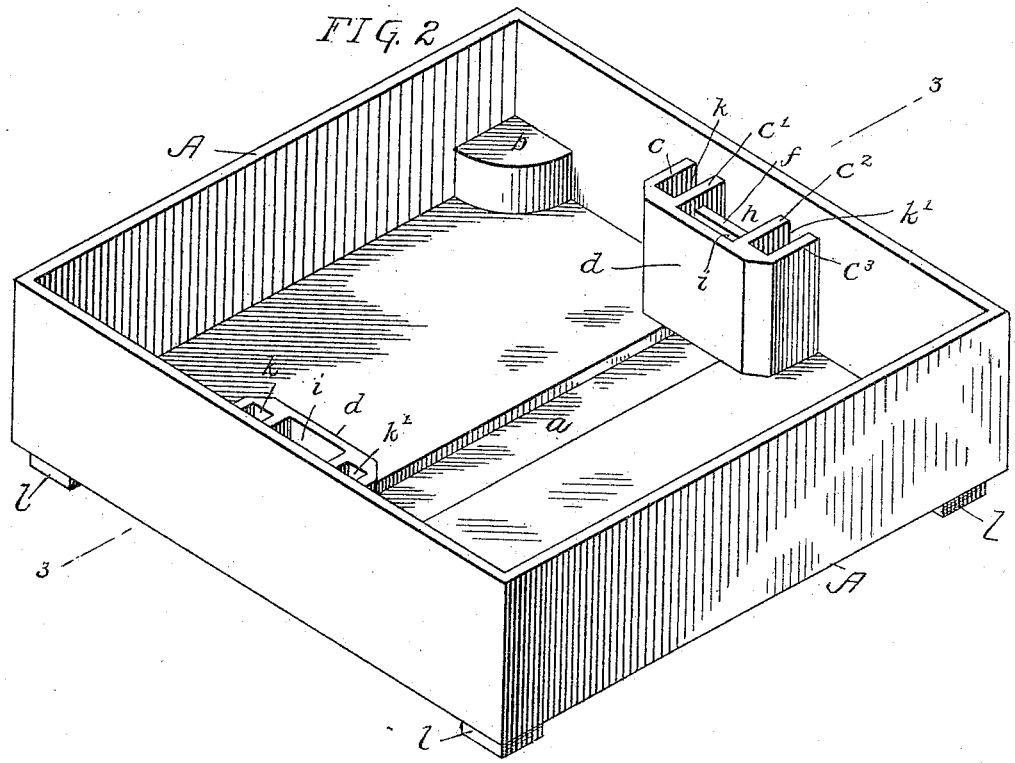
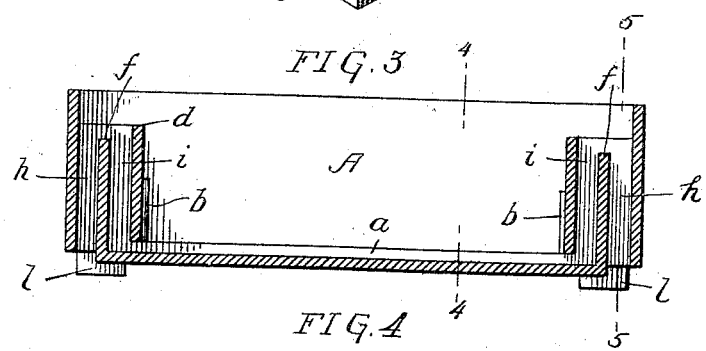
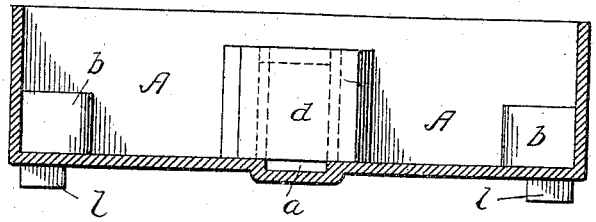
Witnesses:
Jno E Parker
J. Henderson
Inventor:
Herbert S. Lloyd,
by his Attorney,
Horace Pettit.

UNITED STATES PATENT OFFICE.

HERBERT S. LLOYD, OF PHILADELPHIA, PENNSYLVANIA.

STORAGE BATTERY.

SPECIFICATION forming part of Letters Patent No. 604,588, dated May 24, 1898.

Application filed December 23, 1896. Serial No. 616,711. (No model.)

*To all whom it may concern:*

Be it known that I, HERBERT S. LLOYD, a citizen of the United States, and a resident of the city of Philadelphia, State of Pennsylvania, have invented certain new and useful Improvements in Storage Batteries, of which the following is a full, clear, and exact description, reference being had to the accompanying drawings, forming part of the specification.

My invention relates to a certain improvement in cells for storage batteries, and has for its object to provide a battery in the form of a series of cells or sections which may be readily fitted together and the number of sections or separate cells increased to any desired extent without a corresponding increase in the area of floor-space occupied, the cells or sections being uniform and interchangeable and adapted to be placed in a vertical pile of any height.

A further object of the invention is to so construct and to so arrange a number of cells that all of the cells may be supplied with the proper quantity of electrolyte by simply pouring the latter in an opening formed above the top cell and permitting it to overflow from cell to cell until all are supplied.

A further object of the invention is to provide for the ready connection and disconnection of the electrodes and current-conducting wires and to provide for the ventilation of the sections and permit of the escape of the gas generated by the chemical reactions within the battery.

A still further object of the invention is to provide for a more thorough and more economical action of the electrodes by completely submerging both electrodes in the electrolyte and to prevent the deterioration which occurs at the liquid-level when the electrodes are only partially submerged.

Figure 1:
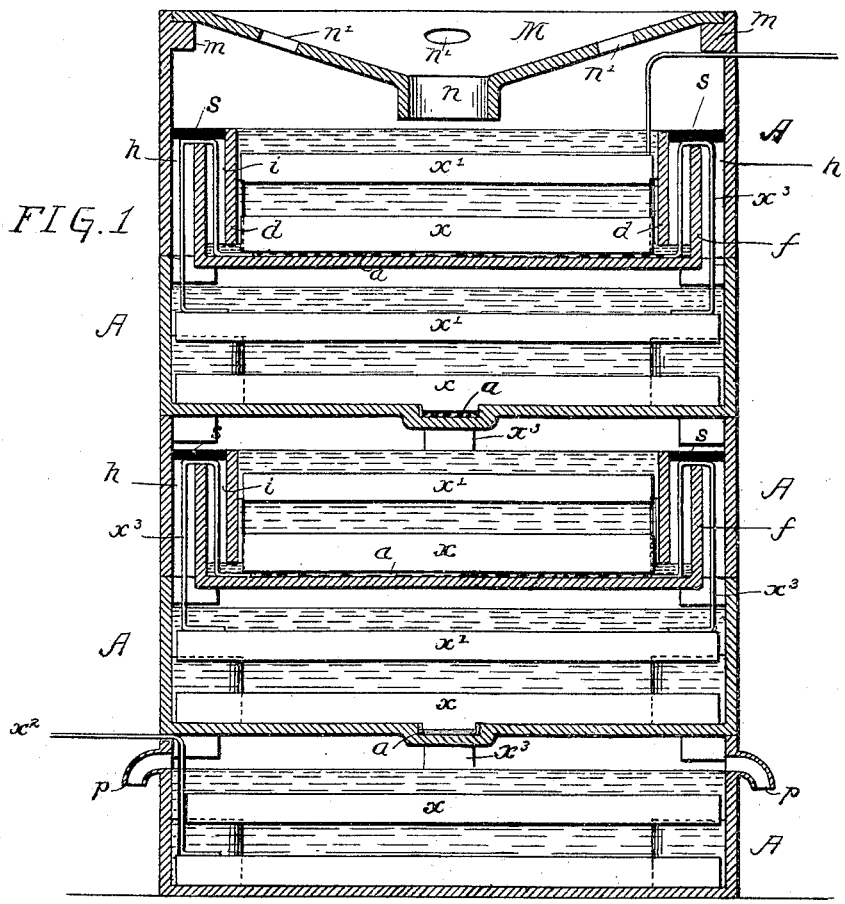
Figure 5:
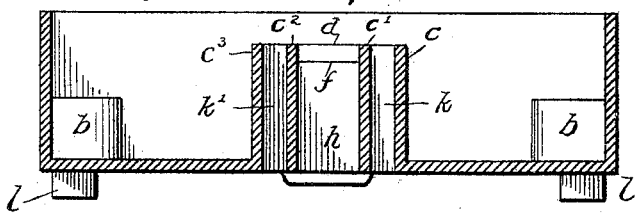
Figure 6:
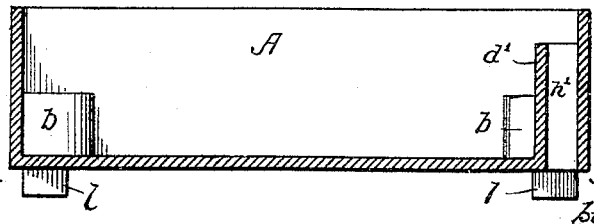

In the accompanying drawings, Figure 1 is a transverse sectional elevation of a storage-battery cell constructed in accordance with my invention, illustrating a series of superposed cells or sections coupled together in such manner as to form a series battery of great power. Fig. 2 is a perspective view of one of the cells or sections detached. Fig. 3 is a transverse sectional elevation of the same on the line 3 3, Fig. 2. Fig. 4 is a similar view on the line 4 4, Fig. 3. Fig. 5 is a sectional elevation of the cell on the line 5 5, Fig. 3; and Fig. 6 is a view similar to Fig. 3, illustrating a modified form of cell.

Referring to the drawings, A represents one of the cells or sections, preferably in the form of a comparatively shallow rectangular pan formed of fiber, vulcanite, glass, or other suitable non-conducting material. Extending centrally across the bottom of this cell is a shallow trough $a$, in which is placed a suitable quantity of mercury to make contact with the lower ribbed surface of the electrode $x$, the latter resting directly upon the bottom of the cell.

Within each corner of the cell are corner pieces or blocks $b$, preferably formed integral with the body of the cell and adapted to support the upper electrode $x'$ in position above the lower electrode, the space between the two and for some distance above the surface of the upper electrode being filled with a suitable electrolyte.

Projecting inwardly from each side of the cell or at about the opposite ends of the mercury-trough are four partitions $c\ c'\ c^2\ c^3$, the outer ends of which are connected by a partition $d$. The top of all the partitions are on the same level and at some little distance below the upper edge of the wall of the cell. The partitions $c'\ c^2$ are connected by a central partition $f$, the top of which is a short distance below the top of the other partitions, and this short partition divides the space bounded by the wall of the cell and the partition $c'$, $c^3$, and $d$ into two openings $h\ i$, the opening $h$ extending directly through the bottom of the cell, while the opening $i$ communicates with the mercury-trough. The openings $k\ k'$, formed by the addition of the partitions $c$ and $c^3$, also extend directly through the bottom of the cell, as shown in Fig. 5.

The tops of the partitions $c\ c^3$ are lower than the walls of the cell and form the liquid-level, and any electrolyte flowing into the cell in excess of the quantity required will overflow through one or other of the partitions and pass down through the openings $k\ k'$ in the bottom of the cell to the next lowest section.

On the under surface of each section I provide, preferably at each corner, square lugs or blocks $l$, which serve as guides in assembling a series of sections, and when two or more cells or sections are placed together these lugs fit within the outer walls of the next lowest cell and serve to keep all of the sections in proper position.

In forming the top cell of a series of cells or sections I preferably increase the height of its walls and arrange at a point just within the top a series of lugs or a flange $m$ for the reception of a cover-plate M, the latter having a central opening $n$, and its upper surface being depressed toward the center for convenience in filling the cells with the electrolyte. The cover is also provided with a number of vent-holes $n'$ for the escape of gas or the passage of air.

The lowermost of a series of sections is arranged somewhat differently from the central or intermediate sections, being provided with overflow-pipes $p$ at the same level as the top of the partitions of the other sections, and in filling a series of sections with the electrolyte it is merely necessary to pour the latter through the opening $n$ in the cover until the liquid commences to escape through the overflow-pipe $p$ of the bottom section. In filling, the top section receives a supply of liquid up to the level of its partition-plates, and as the pouring continues the excess of liquid flows down through the openings $k\ k'$ to the next lowest section, and when this section is filled any further liquid admitted must overflow into the next lowest section, so that at all times each section will have the exact quantity of electrolyte necessary for its proper and efficient action, and if the supply in any one section, either at the top, or center, or at the bottom of a series, should become exhausted and need renewal it is simply necessary to pour in a fresh supply at the top through the opening $n$ and the cell will be properly supplied.

One of the main strips or current-conductors $x^2$ passes into the top of the lowest section or cell and is connected to the lowest electrode therein; but in connecting a series of cells I prefer to arrange the conductors on each side of the electrode, as shown, the strips $x^3$ being connected to the top electrode and thence passing up through the openings $h$, over the short partition $f$, and down through the opening $i$, dipping into the mercury in the trough $a$ of the section or cell immediately above it.

To prevent contact of the electrolyte with the main portion of the conductor $x$, a soft-rubber block $g$ is then placed between the wall of the cell and the partitions $c'$, $c^2$, and $d$, covering the conductors and preventing the overflow of the electrolyte through the openings $h$.

After all of the cells or sections are assembled and filled with the electrolyte and properly connected the openings $h\ h'$ place each cell-section in communication with the cells above and below it, and the gases which accumulate in the free space between the level of the electrolyte in one cell and the bottom of the next higher cell will pass off through these openings from cell to cell and finally escape through the vent-openings $n'$ in the cover M.

The number of partitions and openings in each cell may be reduced to any desired extent, as illustrated, for instance, in Fig. 6, where only one partition $d'$, with its opening $h'$, is shown, the partition being at one side or at the corner of the cell and serving for the passage of the conductor and the overflow of the electrolyte, although a greater number of openings is deemed preferable.

With a cell made in accordance with my invention a whole series may be superposed and a battery of any desired strength or capacity may be built up with but little trouble and without occupying any greater floor-space than would be occupied by a single cell.

As all portions of the electrodes, which may be of lead, zinc, or other suitable material, are submerged in the electrolyte the action of the electrodes will be more perfect and economical and the electrodes as a whole will be utilized in the action of the battery.

Any of the well-known electrolytes may be employed—such, for instance, as dilute sulfuric acid.

It will be understood that various other modifications of the structure herein described may be made without departing from the spirit of my invention—as, for instance, by making the cells circular or other form, or by forming the partitions on the outside instead of on the inside of the cells, or the mercury-trough may be dispensed with and the conductors connected to the lower electrode.

Having thus described my invention, what I claim, and desire to secure by Letters Patent, is—

1. A battery-cell comprising a vessel having vertically-disposed passages $k\ k'$ formed by partitions, $c$, $c'$, $c^2$, $c^3$, $d$, $f$, arranged at the sides of the vessel for the escape of any excess of electrolyte and for the passage of the connecting wires or strips.

2. The combination in a battery-cell of the open-top vessel of non-conducting material, electrode-supports and overflow-partitions in said cell forming passages arranged to allow of the flow of excess of electrolyte into the cell immediately below, and lugs or ribs on the lower surface of said vessel adapted to act as guides in superposing a number of said vessels.

3. The combination in a battery-cell, of the open-top vessel of non-conducting material, vertically-disposed passages formed by partitions, $c$, $c'$, $c^2$, $c^3$, $d$ arranged on each side of the same, a central mercury-trough in the bottom of said vessel, partitions, $f$, extending between the partitions, $c'$, $c^2$, said partitions, $f$, having their tops on a level below the tops of the remaining partitions, electrode-supports within the vessel, and guiding lugs or blocks on the bottom of said vessel, substantially as specified.

4. A series battery comprising a number of superposed cells, overflow-partitions in each cell communicating with an opening in the bottom of said cell, and arranged to form passages for the overflow of the excess of electrolyte into the cell below, electrode-supports in said cells, and connecting wires or strips extending between adjacent cells, substantially as specified.

5. A series battery comprising a number of superposed cells, forming passages arranged to allow of the flow of excess of electrolyte from said cell, overflow-partitions in each cell and connecting-strips extending from opposite sides of the upper electrode of one cell through one of said passages and over one of said partitions to the lower electrode of the cell immediately above it, substantially as specified.

6. A series battery comprising a number of superposed and connected cells, troughs containing mercury in the bottom of each cell in contact with the lower electrode, the conducting wires or strips extending from the upper electrode of one cell to the mercury of the cell immediately above it.

In witness whereof I have hereunto set my hand this 22d day of December, A. D. 1896.

HERBERT S. LLOYD.

Witnesses:
 EDMUND S. MILLS,
 JNO. E. PARKER.